Nov. 20, 1934.  J. BAGGIOLINI  1,981,578
EGG COOKER
Filed Dec. 5, 1933  3 Sheets-Sheet 1
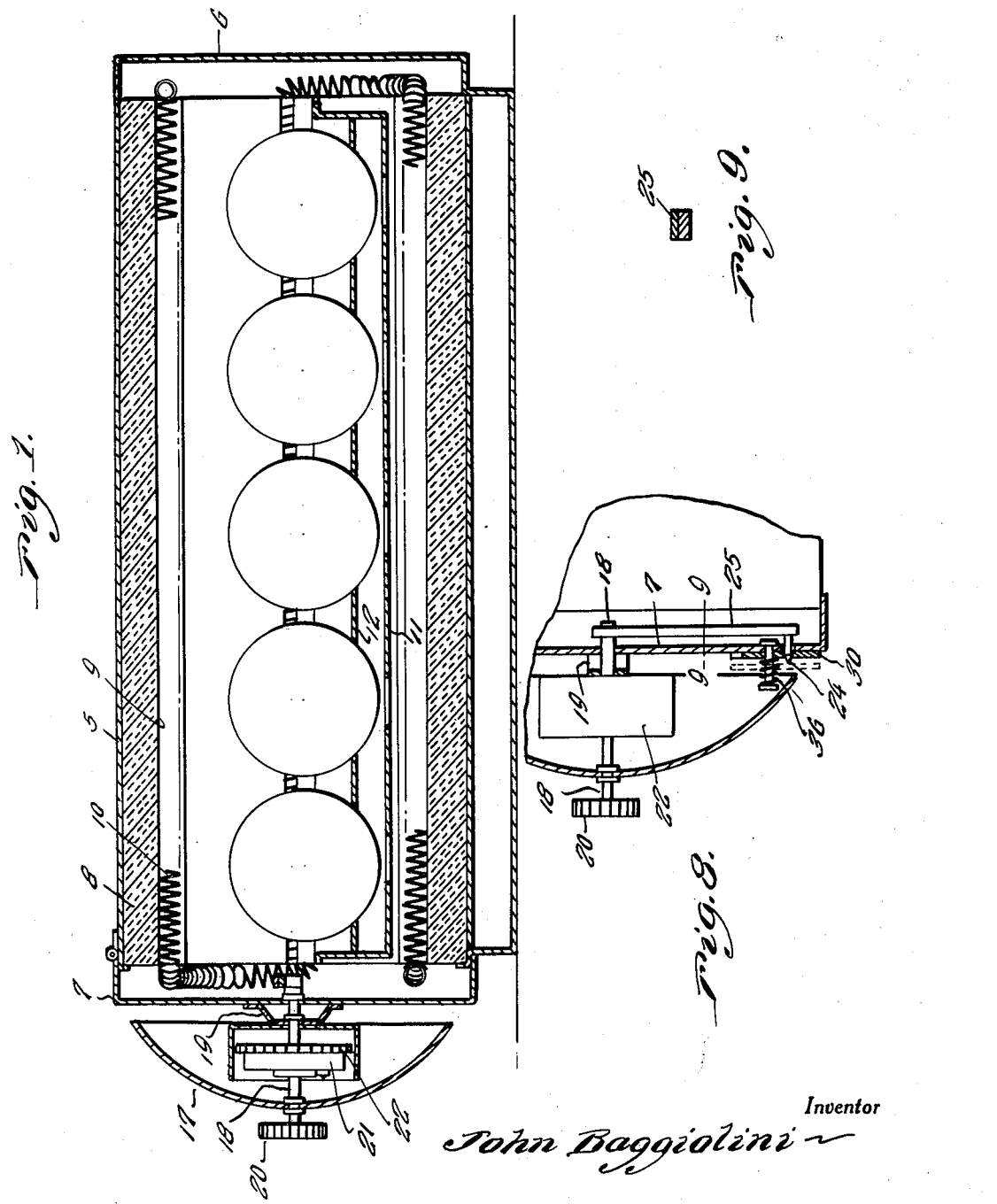
Inventor
John Baggiolini
By Clarence A. O'Brien
Attorney

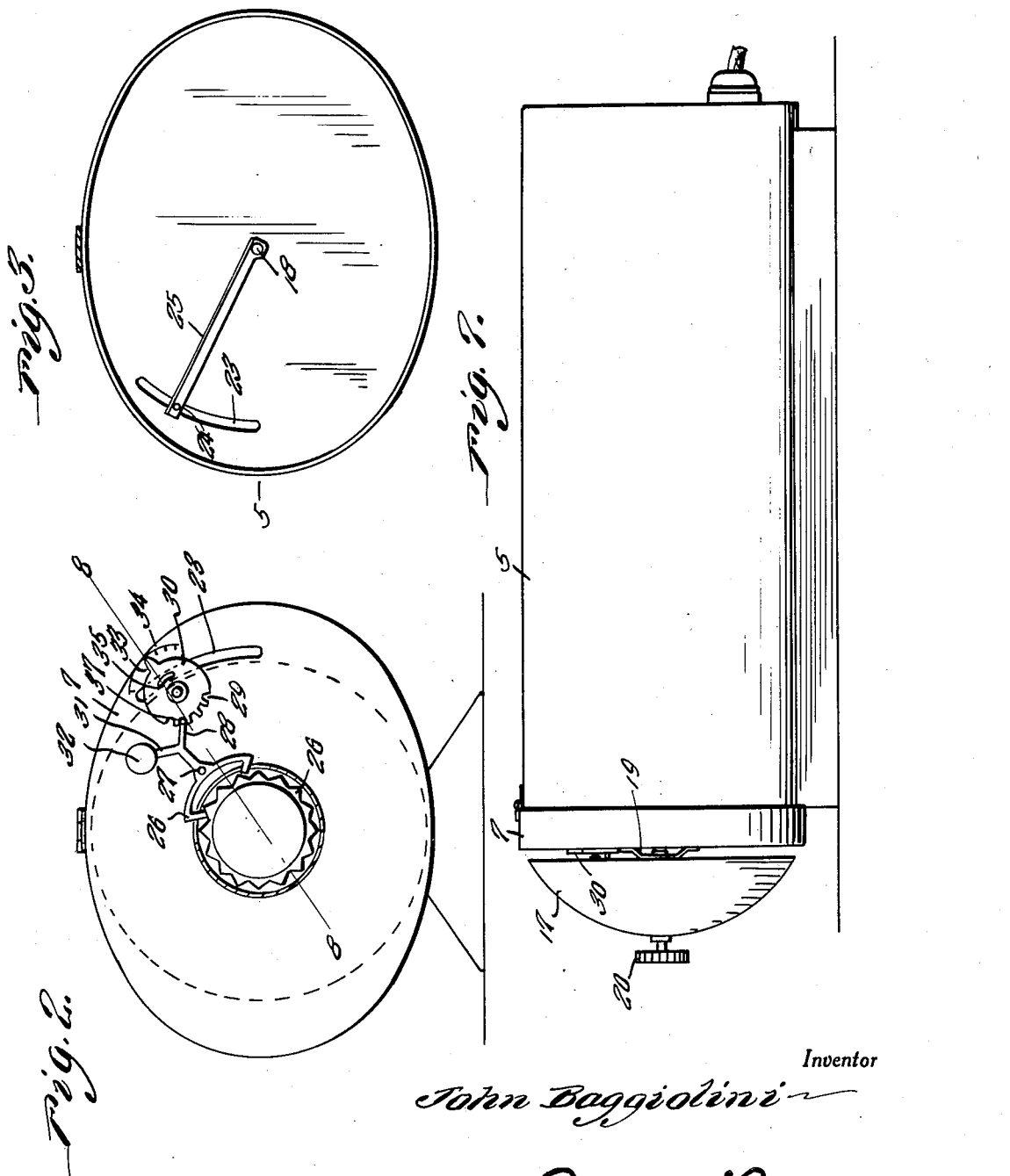

Nov. 20, 1934.　　　J. BAGGIOLINI　　　1,981,578
EGG COOKER
Filed Dec. 5, 1933　　　3 Sheets—Sheet 3
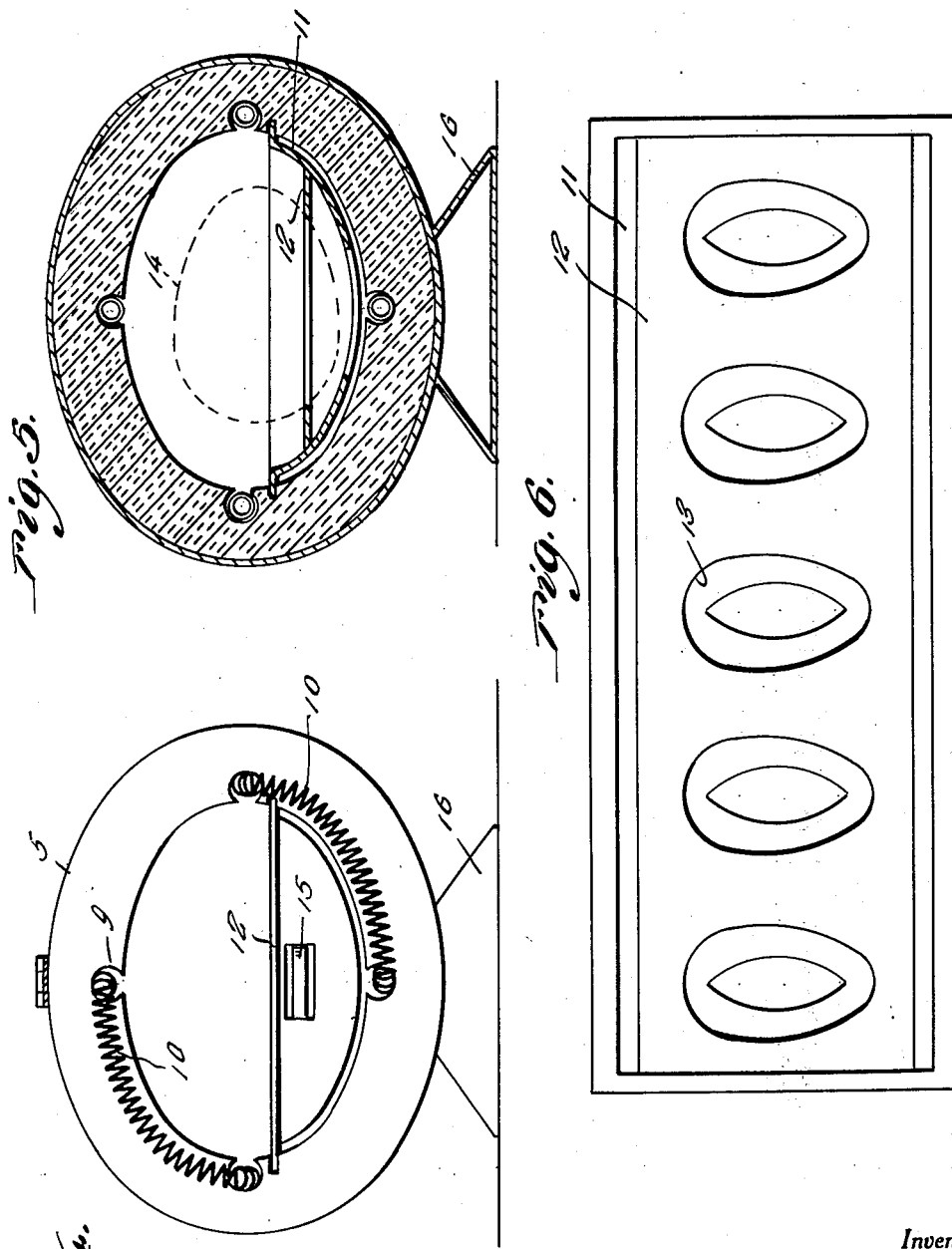
Inventor
John Baggiolini
By Clarence A. O'Brien
Attorney Patented Nov. 20, 1934

1,981,578

UNITED STATES PATENT OFFICE 1,981,578

EGG COOKER

John Baggiolini, Soledad, Calif.

Application December 5, 1933, Serial No. 701,019

2 Claims. (Cl. 219—35)

This invention appertains to new and useful improvements in cooking utensils, and more particularly to a novel device wherein eggs can be cooked in an easy and convenient manner.

An important object of the present invention is to provide an egg cooker wherein the cooking time of the eggs can be regulated predeterminedly.

Another important object of the present invention is to provide an egg cooking device wherein the eggs can be cooked for a predetermined period of time, at the expiration of which an alarm will be sounded.

These and various other important objects and advantages of the invention will become apparent to the reader of the following specification.

In the drawings:—

Figure 1 represents a longitudinal sectional view through the utensil.

Figure 2 represents a front end elevational view of the utensil, with the bell in section.

Figure 3 represents an inside elevational view of the front closure of the utensil.

Figure 4 represents an end elevational view of the utensil, with the cover removed.

Figure 5 represents a transverse sectional view of the utensil.

Figure 6 represents a top plan view of the tray.

Figure 7 represents a side elevational view of the utensil.

Figure 8 represents a fragmentary sectional view taken substantially on line 8—8 of Figure 2.

Figure 9 represents a cross sectional view taken substantially on line 9—9 of Figure 8.

Referring to the drawings wherein like numerals designate like parts, it can be seen in Figures 1 and 5, that numeral 5 generally refers to an outer shell of ovate shape in cross section having the closed end wall 6. The opposite end of this shell is open and has a hingedly connected closure 7. Numeral 8 represents a lining of insulation which is provided with grooveways 9 therein through which the heating element 10 can be trained.

The inside of the lining 8 is provided with a pair of horizontally spaced grooveways for receiving the lateral flanges of the egg tray 11, which tray is provided with a platform 12 therein having openings 13 therein for receiving eggs 14 to be cooked. One end of this tray 11 is provided with a handle 15, as shown in Figure 4. Numeral 16 represents a hollow base for supporting the shell 5 in the manner shown in Figure 5.

Numeral 17 represents a bell which is secured to the stem 18, which stem extends through the bracket 19 on the outer side of the closure 7 and also through the said closure, as shown. The outer end of this stem 18 is provided with a knob 20 whereby the spring 21 of the ratchet wheel 22 can be wound when rotated.

The said closure 7 has an arcuate-shaped slot 23 therein through which the pintle 24 on the free end of the bimetal thermostatic element 25 protrudes, the other end of the thermostatic element being secured to the stem 18 in the manner shown.

Numeral 26 represents an escapement pawl swingably supported, as at 27, to the closure 7, this escapement being provided with an arm 28 engageable with the teeth 29 of the disk 30 and also with an arm 31 carrying the bell proper 32.

The disk 30 is provided with a radially disposed pointer 33 pointing out the scape 34 on the closure 7. This disk 30 is provided with an arcuate slot 35 therein and a spring 36 interposed between the closure 7 and the disk 30 serves to normally maintain the disk projected outwardly from the closure 7 and engaged with the laterally disposed pintle 37 on the arm 28 of the clapper and escapement device 26.

It can now be seen that when the ratchet wheel 22 is properly set and the pintle 37 is engaged with the proper tooth 29 of the disk 30, the thermostatic element pin 24 will be engaged against the back side of the disk 30. After a predetermined interval, the thermostatic element will have moved the pin 24 to a point where it is registering with the slot 35 of the disk 30, whereupon the spring 36 attracts the disk and disengages the same and its teeth 29 from the pintle 37, thus releasing the escapement device 26 so that the ratchet wheel 22 acts against the same and oscillates the clapper 32 so that it strikes the bell 17 and warns the attendant.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. An egg cooker comprising an elongated casing provided with a closure at one end, an elongated tubular wall of insulation, said wall being provided with longitudinally extending grooveways on its inner side, a heating element disposed in the grooves, said wall being provided at its inner side with a pair of longitudinally extending channels disposed on a horizontal plane and in opposite side portions of the walls, and an egg holding tray for disposition into the said wall and provided with laterally extending flanges for slidable engagement in the said channels.

2. An egg cooker comprising an elongated casing provided with a closure at one end, an elongated tubular wall of insulation, said wall being provided with longitudinally extending grooveways on its inner side, a heating element disposed in the grooves, said wall being provided at its inner side with a pair of longitudinally extending channels disposed on a horizontal plane and in opposite side portions of the walls, an egg holding tray for disposition into the said wall and provided with laterally extending flanges for slidable engagement in the said channels, said tray being provided with a horizontal partition therein, said partition having openings therein for partly receiving eggs to be cooked, said tray being provided with openings in the bottom thereof opposite the openings in the partition so that heat can pass upwardly into the tray.

JOHN BAGGIOLINI.